United States Patent
Zhao et al.

(10) Patent No.: US 10,443,777 B2
(45) Date of Patent: Oct. 15, 2019

(54) LEVELING DEVICE OF HOUSEHOLD APPLIANCE AND HOUSEHOLD APPLIANCE WITH SAME

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/564,841

(22) PCT Filed: Dec. 28, 2016

(86) PCT No.: PCT/CN2016/112600
§ 371 (c)(1),
(2) Date: Oct. 6, 2017

(87) PCT Pub. No.: WO2018/006561
PCT Pub. Date: Jan. 11, 2018

(65) Prior Publication Data
US 2018/0274714 A1    Sep. 27, 2018

(30) Foreign Application Priority Data
Jul. 8, 2016   (CN) .......................... 2016 1 0538118

(51) Int. Cl.
*A47B 91/16*    (2006.01)
*F16M 7/00*    (2006.01)
(Continued)

(52) U.S. Cl.
CPC ............. *F16M 7/00* (2013.01); *D06F 39/125* (2013.01); *A47L 15/4253* (2013.01); *F16M 2200/044* (2013.01); *F16M 2200/08* (2013.01)

(58) Field of Classification Search
CPC ..................................................... A47B 91/16
(Continued)

(56) References Cited

U.S. PATENT DOCUMENTS

| 2,635,838 A | * | 4/1953 | Branson | ................ | F16F 15/023 |
| | | | | | 188/298 |
| 3,768,766 A | * | 10/1973 | Bain | ..................... | A47B 91/16 |
| | | | | | 248/188.2 |

(Continued)

*Primary Examiner* — Terrell L McKinnon
*Assistant Examiner* — Michael McDuffie
(74) *Attorney, Agent, or Firm* — Buchanan Ingersoll & Rooney PC (57) ABSTRACT

A household appliance leveling device comprises at least two leveling feet mounted at the bottom of the appliance, wherein each leveling foot comprises a fixed part and a movable part, the fixed part is mounted at the bottom of the household appliance, one end of the movable part is telescopically sleeved with the fixed part while the other end is arranged on a support plane, a closed chamber is formed between the fixed part and the movable part, and the closed chamber is provided with a hydraulic medium; the closed chambers of at least two said leveling feet communicate with each other, the hydraulic medium flows between the closed chambers of the leveling feet communicating with each other, and the movable parts expand or contract along with the flowing of the hydraulic medium to perform automatic leveling.

18 Claims, 7 Drawing Sheets

(51) Int. Cl.
*D06F 39/12* (2006.01)
*A47L 15/42* (2006.01)

(58) Field of Classification Search
USPC ... 248/550, 188, 188.1, 188.2, 188.3, 188.5, 248/188.8; 188/151 R
See application file for complete search history.

(56) References Cited

U.S. PATENT DOCUMENTS

| | | | | |
|---|---|---|---|---|
| 4,625,424 | A * | 12/1986 | de la Haye | G12B 5/00 248/649 |
| 4,967,994 | A * | 11/1990 | Rice | D06F 39/001 248/649 |
| 6,009,815 | A * | 1/2000 | Hartman | A47B 91/02 108/147 |
| 7,431,248 | B2 * | 10/2008 | Cournoyer | A47B 91/02 248/188.2 |
| 7,597,294 | B2 * | 10/2009 | Lotz | F16M 7/00 182/200 |
| 8,104,724 | B2 * | 1/2012 | Sorohan | A47B 91/16 248/188.3 |
| 8,689,706 | B2 * | 4/2014 | Gompper | F16B 12/44 108/158.11 |
| 9,909,709 | B2 * | 3/2018 | Pike | A47B 91/10 |
| 2003/0193000 | A1 * | 10/2003 | Leveridge | E06C 7/44 248/188.2 |
| 2007/0023591 | A1 * | 2/2007 | Kwon | D06F 39/125 248/188.3 |
| 2010/0224745 | A1 * | 9/2010 | Orlov | F16M 7/00 248/188.3 |
| 2012/0193503 | A1 * | 8/2012 | Pike | A47B 91/16 248/560 |
| 2016/0088930 | A1 * | 3/2016 | Hansen | F16F 9/0245 108/147 |
| 2018/0237978 | A1 * | 8/2018 | Zhao | F16M 7/00 |
| 2018/0245266 | A1 * | 8/2018 | Zhao | A47B 91/005 |
| 2019/0011075 | A1 * | 1/2019 | Zhao | F16M 7/00 |

* cited by examiner

LEVELING DEVICE OF HOUSEHOLD APPLIANCE AND HOUSEHOLD APPLIANCE WITH SAME

TECHNICAL FIELD

The present disclosure relates to the technical field of household appliances, and in particular relates to a household appliance leveling device and a household appliance with the same.

BACKGROUND

The whole household appliances, such as a washing machine and a refrigerator, vibrate due to an uneven ground. Such instability may change the horizontality of the washing machine and causes stronger vibration, so that noise of the washing machine will be bigger and bigger when the washing machine is used for a long time by such a vicious circle, and customer experience of the product is seriously affected. And such instability may cause damage to a compression structure in a compressor and a housing of the refrigerator due to vibration, and thus may cause extremely poor user experience. Other household appliances also have such problems.

The household appliance is generally provided with a leveling device at the bottom of the housing; when in placement, the household appliance can reach a stable placing state by adjusting the leveling device; and after leveling and being placed, the household appliance can be supported by the leveling device and thus keeps stable.

Taking the washing machine for example, the existing washing machine is generally provided with bolt feet mounted at the bottom of a housing or the whole machine. Each bolt foot comprises a screw, a nut gasket and a rubber gasket, wherein the nut gasket is able to rotate up and down on the screw, and the screw can also rotate up and down in a threaded hole in a base plate of the housing. A height adjustment of the washing machine is achieved by adjusting the lengths of the screws of the bolt feet screwed into the threaded holes in the base plate, and most washing machines are risen by counterclockwise rotating the feet, and lowered by clockwise rotating the feet, and the nut gaskets for preventing from loosening are screwed down to keep the feet steady after the heights of the feet are adjusted.

Although the washing machine can be leveled via adjusting the feet of the washing machine, a user needs to adjust manually; and if the washing machine is heavy or the placing space of the washing machine is small, the user is extremely inconvenient to operate. Furthermore, the vibration of the washing machine also acts on the leveling feet during a long-term working process, so that the leveling feet are prone to be failed to support, and thus the washing machine is placed unevenly.

For example, the existing 8 KG drum washing machine is generally 80 Kg weight that is relatively heavy, so that customers are extremely inconvenient to adjust, and even adjustment is completed, the situation that the washing machine is adjusted to the best state cannot be ensured. When the washing machine is in washing process, and particularly accelerated to 1400 r/min from 0 r/min for spin-drying, once the washing machine is placed unevenly or the foot of the washing machine is failed to support, great vibration may be caused, and use comfort of the customers are greatly influenced.

Furthermore, due to vibration caused by uneven placement of the washing machine, the screws of the feet may be loosened and thus brackets of the feet move vertically, and such instability may change the horizontality of the washing machine and cause stronger vibration. Such vicious cycle leads to bigger and bigger noise when the washing machine is used for the long time, which also causes certain damage to the washing machine and shortens the service life of the same.

In the view of foregoing, the present disclosure is proposed.

SUMMARY

In order to solve the above problems, a first object of the present disclosure is to provide a household appliance leveling device, and specifically, the following technical scheme is adopted.

A household appliance leveling device comprises at least two leveling feet mounted at the bottom of a household appliance, wherein each leveling foot comprises a fixed part and a movable part, the fixed part is mounted at the bottom of the household appliance, one end of the movable part is telescopically sleeved by/telescopically sleeves the fixed part while the other end of the movable part is arranged on a support plane. A closed chamber is formed between the fixed part and the movable part, and the closed chamber is provided with a hydraulic medium.

The closed chambers of at least two said leveling feet communicate with each other via high-pressure oil pipe sets, the hydraulic medium flows under pressure between the closed chambers of the leveling feet communicating with each other, and the movable parts expand or contract along with the flowing of the hydraulic medium to perform automatic leveling.

Acting contact surfaces of the hydraulic medium in the leveling feet communicating with each other via the high-pressure oil pipe sets have same or different areas.

Further, the area of the acting contact surface of the hydraulic medium in each of the leveling feet communicating with each other via the high-pressure oil pipe sets is in direct proportion to a pressure value of pressure borne by the corresponding leveling foot.

Further, the fixed part is a cylinder, the movable part is a plunger structure, the cylinder is provided with a hollow chamber therein, the plunger structure is provided with a plug at one end, the plug is arranged in the hollow chamber in a relatively sliding manner and keeps sealed to form a sealed chamber. The plunger structure is provided with a support at the other end, and the support is arranged on the support plane.

The cylinders of the leveling feet communicating with each other via the high-pressure oil pipe sets have different inner diameters.

Further, the inner diameter of the cylinder of each of the leveling feet communicating with each other via the high-pressure oil pipe sets is in direct proportion a pressure value of pressure borne by the corresponding leveling foot.

Further, the leveling device comprises a first leveling feet and a second leveling feet, wherein the first leveling feet and the second leveling feet communicate with each other via the high-pressure oil pipe sets.

The area of the acting contact surface of the hydraulic medium in the first leveling foot is larger than the area of the acting contact surface of the hydraulic medium in the second leveling foot.

Further, the leveling device comprises at least two first leveling feet and at least two second leveling feet, wherein each of the at least two first leveling feet and the at least two second leveling feet is connected with a communication device via the high-pressure oil pipe set to achieve mutual communication of the closed chambers of all the leveling feet.

The area of the acting contact surface of the hydraulic medium in each leveling foot is larger than the area of the acting contact surface of the hydraulic medium in each second leveling foot.

Further, all the first leveling feet are positioned on one side of the communication device, and all the second leveling feet are positioned on the other side of the communication device.

Further, the leveling device comprises one first leveling foot and at least two second leveling feet, wherein each second leveling foot communicate with the first leveling foot via the high-pressure oil pipe set.

The area of the acting contact surface of the hydraulic medium in the first leveling foot is larger than the area of the acting contact surface of the hydraulic medium in the second leveling foot.

Further, an inner diameter d1 of the cylinder of the first leveling foot and an inner diameter d2 of the cylinder of the second leveling foot meet the following condition:

a pressure borne by the first leveling foot is FA, a pressure borne by the second leveling foot is FB, and when $FA=\lambda FB$, $d1=\sqrt{\gamma}d2$.

A second object of the present disclosure is to provide a household appliance with the household appliance leveling device.

According to the household appliance leveling device provided by the present disclosure, based on hydraulic principles, the feet of the household appliance leveling device are provided with the hydraulic medium, and the feet automatically performs adaptive adjustment for different pressures borne by the feet due to fluidity of the hydraulic medium. In addition, the acting contact surfaces of the hydraulic medium in the leveling feet communicating with each other via the high-pressure oil pipe sets have different areas, so that when the leveling device is used for automatically leveling a household appliance of which a center of gravity is not on a geometrical center, the leveling foot of which the acting contact surface of the hydraulic medium is large can be arranged on the side. To which the center of gravity is biased, of the household appliance, and thus the leveling feet are uniformly stressed, and the whole household appliance is still horizontal after leveling.

Therefore, the household appliance leveling device provided by the present disclosure is more suitable for household appliances of which the centers of gravity do not coincide with the geometrical centers, and the leveling feet of the leveling device are uniformly stressed after leveling, so that the service life of the leveling device is ensured. And expansion and contraction quantities of the leveling feet of the leveling device are approximately same after leveling, so that the horizontality of the whole household appliance is ensured, and the internal mechanism of the household appliance has stronger working stability.

Reference signs in the drawings: 100—first leveling foot; 101—first plunger structure; 102—first cylinder; 103—first support; 200—high-pressure oil pipe set; 300—second leveling foot; 301—second plunger structure; 302—second cylinder; 303—second support; 400—hydraulic medium; 500—control panel; 600—communication device; 700—casing; 701—base plate; and 702—front panel.

DETAILED DESCRIPTION

In the following, a household appliance leveling device and a household appliance with the same provided by the present disclosure are described in detail in conjunction with the drawings.

Embodiment 1

A household appliance leveling device provided by this embodiment comprises at least two leveling feet mounted at the bottom of a household appliance, wherein each leveling foot comprises a fixed part and a movable part. The fixed part is mounted at the bottom of the household appliance, one end of the movable part is telescopically sleeved by/telescopically sleeves on the fixed part while the other end A03 of the movable part is arranged on a support plane. A closed chamber is formed between the fixed part and the movable part, and the closed chamber is provided with a hydraulic medium; the closed chambers of at least two said leveling feet communicate with each other via high-pressure oil pipe sets, the hydraulic medium flows under pressure between the closed chambers of the leveling feet communicating with each other, and the movable parts expand or contract along with the flowing of the hydraulic medium to perform automatic leveling. And acting contact surfaces of the hydraulic medium in the leveling feet communicating with each other via the high-pressure oil pipe sets have same areas.

Figure 1:
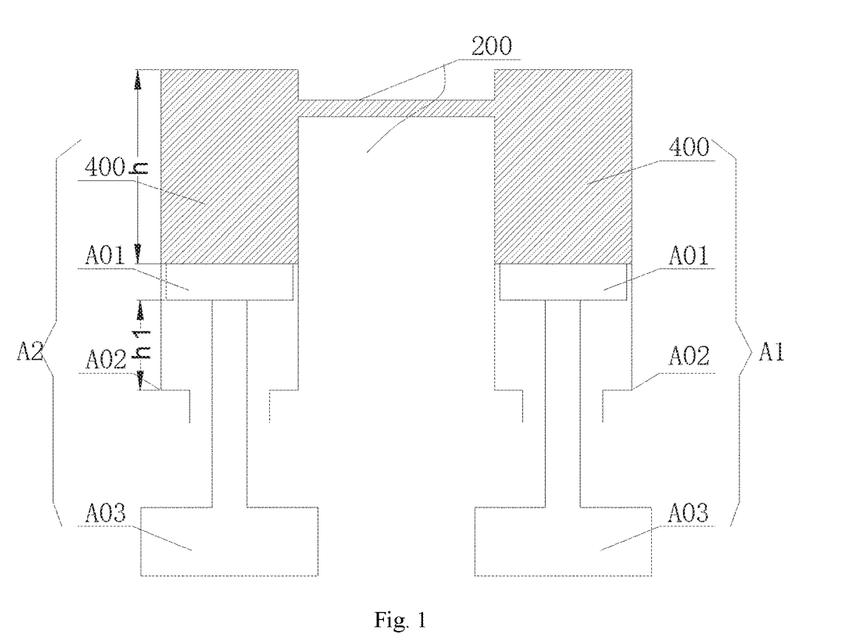
FIG. 1 is a structural schematic diagram of a leveling device provided by an embodiment of the present disclosure.

By utilizing hydraulic principles, the leveling feet of this embodiment can achieve an automatic leveling function specifically as follows:

initial states of the leveling feet are as shown in the FIG. 1; it is ensured that movable parts A01 can move freely in cylinders A02 with a maximum stroke of h+h1, and the movable parts A01 and the cylinders A02 are sealed without oil leakage. A leveling foot A1 and a leveling foot A2 are hermetically fastened and connected via a high-pressure oil pipe set; the cylinder A02 of each leveling foot is provided with a certain volume, such as a volume of the cylinder at the height h, of hydraulic oil, and the high-pressure oil pipe set 200 is filled up with the hydraulic oil.

According to a static pressure transfer principle, in a closed container, namely in the cylinders A02 of the two leveling feet and the high-pressure oil pipe set 200 which are connected, pressure intensity applied to static liquid is simultaneously transferred to each point in an equivalent manner. In hydromechanics, due to liquid fluidity, a change in pressure intensity occurring in a part of the static liquid in the closed container will be transferred towards all directions with a constant size. It is understandable that if pressure intensity applied to the hydraulic oil in the cylinder of the leveling foot A1 is not equal to pressure intensity applied to the hydraulic oil in the cylinder of the leveling foot A2, the hydraulic oil will flow to the leveling foot with a small pressure intensity from the leveling foot with a large pressure intensity, and the leveling foot will be automatically compressed or contracted to make the pressure intensities equal. In principle, maximum leveling of the double of h1 can be achieved by the two feet.

Figure 2:
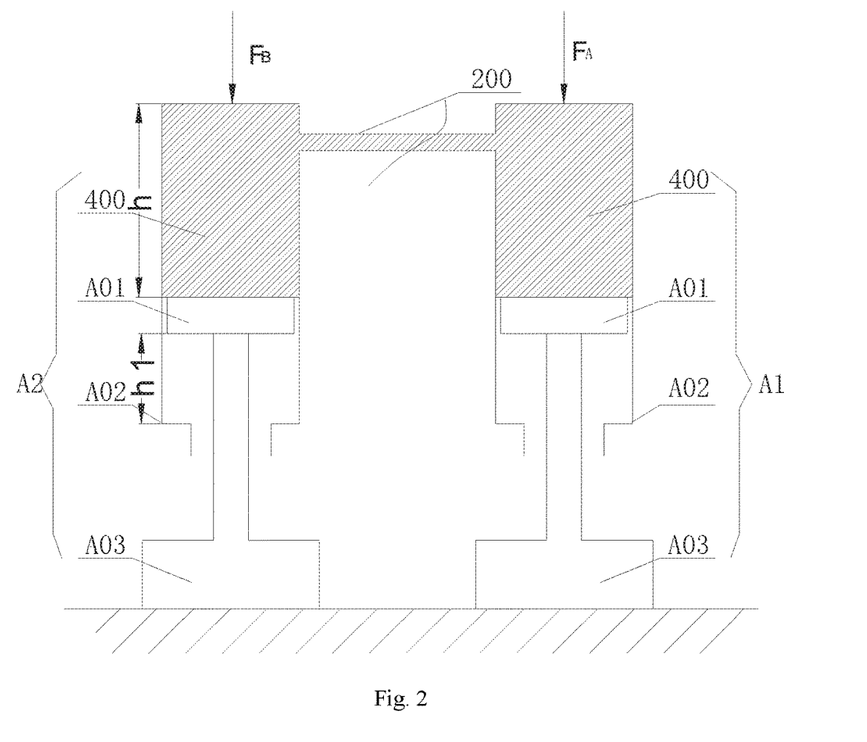
FIG. 2 is a schematic diagram of a first arrangement of the leveling device provided by the embodiment of the present disclosure.

A first arrangement of the leveling feet is as shown in the FIG. 2: the leveling feet bear uniformly and are horizontally placed.

If the center of gravity of the household appliance is on its geometrical center, and the leveling feet are uniformly distributed on the household appliance, that is to say a pressure borne by the leveling foot A1 is the same as a pressure borne by the leveling foot A2, $F_A = F_B$, diameters of the movable parts A01 are set to be the same, which means that contact area between the movable part A01 of the leveling foot A1 and the hydraulic oil is the same as contact area between the movable part A01 of the leveling foot A2 and the hydraulic oil, $S_A = S_B$. If the household appliance is on a horizontal plane, $$\frac{F_A}{S_A} = \frac{F_B}{S_B},$$

so that the pressure intensities of the hydraulic oil in the two feet are same, and the hydraulic oil stops flowing and thus keeps the initial state.

Figure 3:
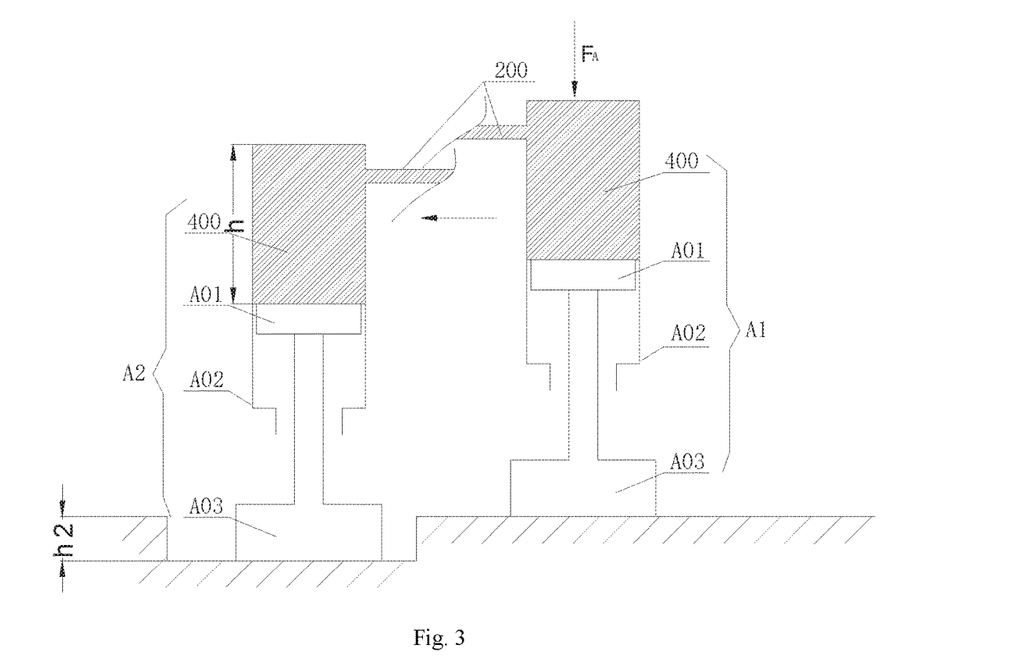
FIG. 3 is a schematic diagram of a second arrangement of the leveling device provided by the embodiment of the present disclosure.
Figure 4:
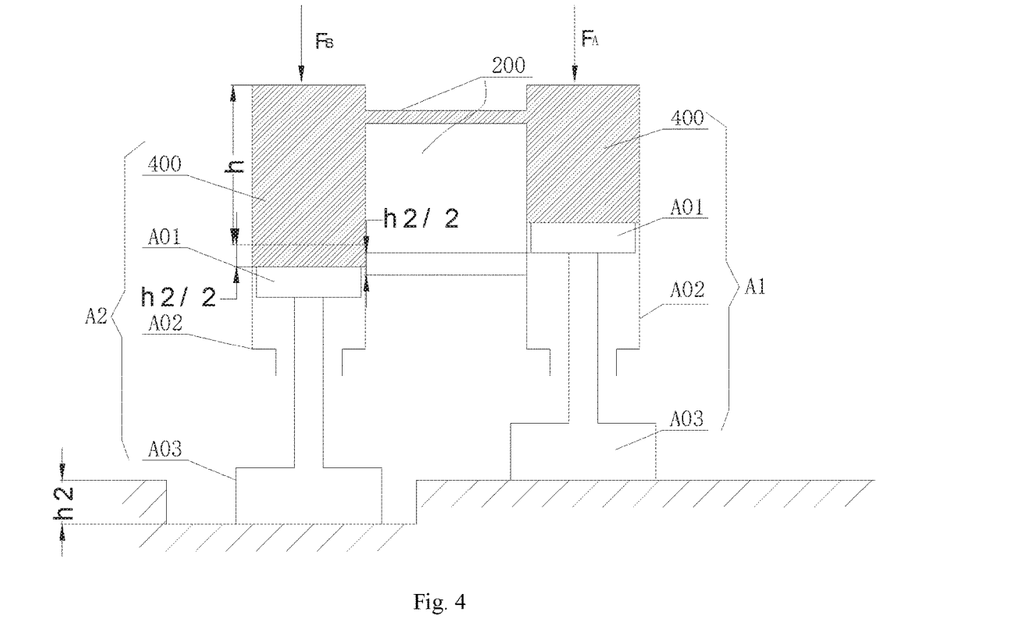
FIG. 4 is a schematic diagram of the second arrangement of the leveling device provided by the embodiment of the present disclosure.

A second arrangement of the leveling feet is as shown in the FIG. 3 and FIG. 4: the leveling feet bear uniformly and are not horizontally placed.

Even the leveling feet are not in the same plane, for example, the leveling foot A2 is in a pit with a depth of h2, and the leveling foot A1 is stressed firstly, as the hydraulic oil in the cylinder A02 of the leveling foot A1 has large pressure intensity, the hydraulic oil flows to the leveling foot A2; and when the movable part A01 of the leveling foot A1 is compressed to be shortened by h2/2, and the movable part A01 of the leveling foot A1 is elongated by h2/2, pressure borne by the leveling foot A1 is the same as pressure borne by the leveling foot A2, $F_A = F_B$ due to the fact that the leveling feet bear uniformly; diameters of the movable parts are set to be the same, that is to say contact area between the movable part of the leveling foot A1 and the oil is the same as contact area between the movable part of the leveling foot A2 and oil, $S_A = S_B$. Even the household appliance is on the horizontal plane, $$\frac{F_A}{S_A} = \frac{F_B}{S_B},$$

and thus the pressure intensities of the hydraulic oil in the two feet are same, and the hydraulic oil stops flowing and thus keeps the horizontal state.

Figure 5:
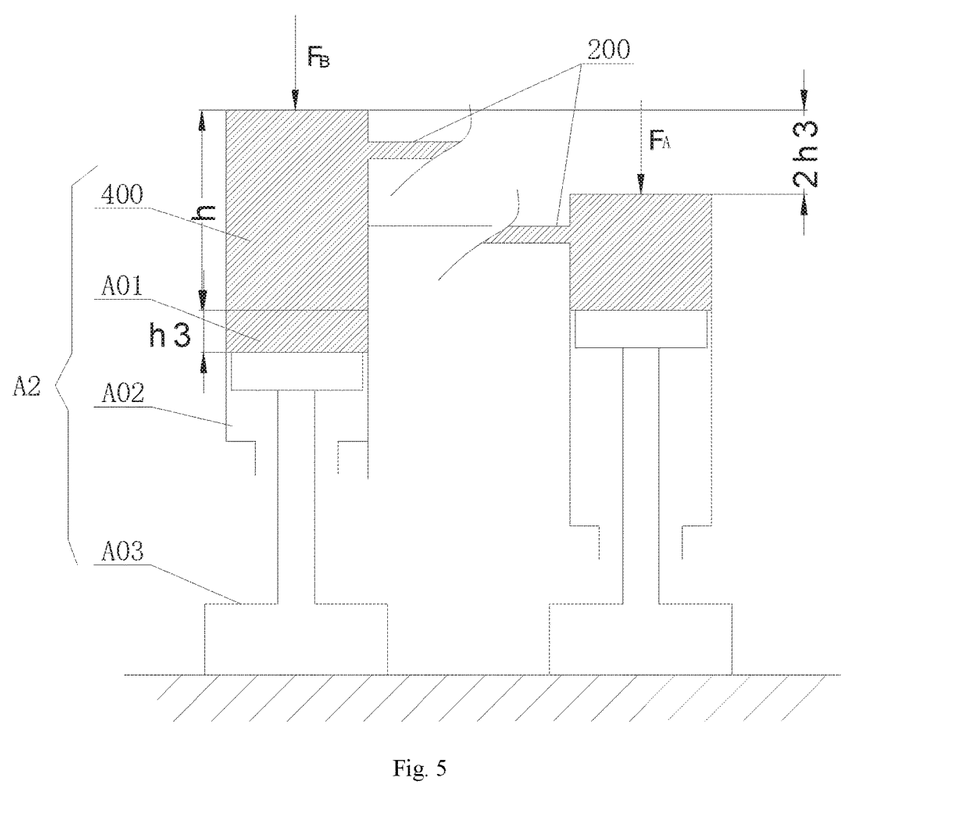
FIG. 5 is a horizontal placement schematic diagram of a third arrangement of the leveling device provided by the embodiment of the present disclosure.

A third arrangement of the leveling feet is as shown in the FIG. 5: the leveling feet bear uniformly and are horizontally or not horizontally placed.

As shown in the FIG. 5, even the leveling feet are in the same plane, as a center of gravity of an object borne by the leveling may be not on a geometrical center of the object, even the leveling feet are uniformly arranged, some leveling feet may bear larger stress, for example, the stress of the leveling foot A1 is the double of the stress of the leveling foot A2, i.e. $F_A = 2F_B$. The diameters of the movable parts are set to be the same, that is to say contact area between the movable part A01 of the leveling foot A1 and the hydraulic oil is the same as contact area between the movable part A01 of the leveling foot A2 and the hydraulic oil, $S_A = S_B$, then pressure intensities meet $$P_A = 2P_B, \text{ i.e. } \frac{F_A}{S_A} = 2\frac{F_B}{S_B},$$

so that the pressure intensity of the hydraulic oil of the leveling foot A1 is the double of the pressure intensity of the hydraulic oil of the leveling foot A2, the hydraulic oil will flow to the leveling foot A2 from the leveling foot A1 until the liquid level of the hydraulic oil in the cylinder A02 of the leveling foot A1 is high, the leveling foot A1 is compressed to be shortened by h3, the leveling foot A2 is elongated by h3, and a hydraulic pressure difference is formed between the leveling foot A1 and the leveling foot A2 due to liquid height difference, so that the pressure intensities of the hydraulic oil of the two feet are same, $$P_A = P_B + \Delta P, \text{ i.e. } \frac{F_A}{S_A} = \frac{F_B}{S_B} + 2\rho gh3,$$

the hydraulic oil stops flowing, but the feet are inconsistent in height, and thus automatic leveling of the object cannot be achieved.

Embodiment 2

Centers of gravity of fewer existing household appliances are on geometrical centers of the same, and the centers of gravity of most existing household appliances are not on the geometrical centers. In general, a following situation may be caused: on a horizontal plane, feet have different heights due to different pressure borne by oil, so that a household appliance on the feet is in an overall inclined state, such situation becomes serious when the foot A1 bears most gravity of the object and is in a boss position.

In order to enable the leveling feet to be more applicable to the household appliances of which the centers of gravity are not on the geometrical centers, and solve the situation that the leveling feet are nonuniformly stressed, this embodiment provides the technical scheme as follows.

A household appliance leveling device provided by this embodiment comprises at least two leveling feet mounted at the bottom of a household appliance, wherein each leveling foot comprises a fixed part and a movable part, the fixed part is mounted at the bottom of the household appliance, one end of the movable part is telescopically sleeved by/telescopically sleeves the fixed part while the other end is arranged on a support plane, a closed chamber is formed between the fixed part and the movable part, and the closed chamber is provided with a hydraulic medium; the closed chambers of at least two said leveling feet communicate with each other via high-pressure oil pipe sets, the hydraulic medium flows under pressure between the closed chambers of the leveling feet communicating with each other, and the movable parts expand or contract along with the flowing of the hydraulic medium to perform automatic leveling; and acting contact surfaces of the hydraulic medium in the leveling feet communicating with each other via the high-pressure oil pipe sets have different areas.

According to the household appliance leveling device provided by this embodiment, based on hydraulic principles, the feet of the household appliance leveling device are provided with the hydraulic medium, and the feet automatically performs adaptive adjustment for different pressures borne by the feet due to fluidity of the hydraulic medium; in addition, the acting contact surfaces of the hydraulic medium in the leveling feet communicating with each other via the high-pressure oil pipe sets have different areas, so that when the leveling device is used for automatically leveling a household appliance of which a center of gravity is not on a geometrical center, the leveling foot of which the acting contact surface of the hydraulic medium is large can be arranged on the side, to which the center of gravity is biased, of the household appliance, and thus the leveling feet are uniformly stressed, and the whole household appliance is still horizontal after leveling.

Therefore, the household appliance leveling device provided by this embodiment is more suitable for household appliances of which the centers of gravity do not coincide with the geometrical centers, and the leveling feet of the leveling device are uniformly stressed after leveling, so that the service life of the leveling device is ensured; and expansion and contraction quantities of the leveling feet of the leveling device are approximately same after leveling, so that the horizontality of the whole household appliance is ensured, and the internal mechanism of the household appliance has stronger working stability.

Further, in this embodiment, the area of the acting contact surface of the hydraulic medium in each of the leveling feet communicating with each other via the high-pressure oil pipe sets is in direct proportion to a pressure value of pressure borne by the corresponding leveling foot. Therefore, the acting contact surface of the hydraulic medium in the leveling foot to bear large pressure also has larger area, so that when the pressure intensities in the leveling feet communicating with each other via the high-pressure oil pipe sets are same, that is to say, when horizontality is achieved, the expansion and contraction quantities of the movable parts are the same or similar, and thus horizontal placement of the household appliance is ensured.

Specifically, in this embodiment, the fixed parts are cylinders, the movable parts are plunger structures, each cylinder is provided with a hollow chamber therein, each plunger structure is provided with a plug at one end, the plugs can be arranged in the hollow chambers in a relatively sliding manner and keep sealed to form closed chambers, each plunger structure is provided with a support at the other end, and the supports are arranged on the support plane; and the cylinders of the leveling feet communicating with each other via the high-pressure oil pipe sets have different inner diameters. In this embodiment, the inner diameters of the cylinders are designed to be different, and the plugs of the plunger structures are hermetically connected with the cylinders, so that the plugs of the plunger structures are different in size, and finally the acting contact surfaces of the hydraulic medium in the leveling feet have different areas.

The areas of the acting contact surfaces of the hydraulic medium are finally embodied in the inner diameters of the cylinders, so that the inner diameter of the cylinder of each of the leveling feet communicating with each other via the high-pressure oil pipe sets is in direct proportion to a pressure value of pressure borne by the corresponding leveling foot.

Figure 6:
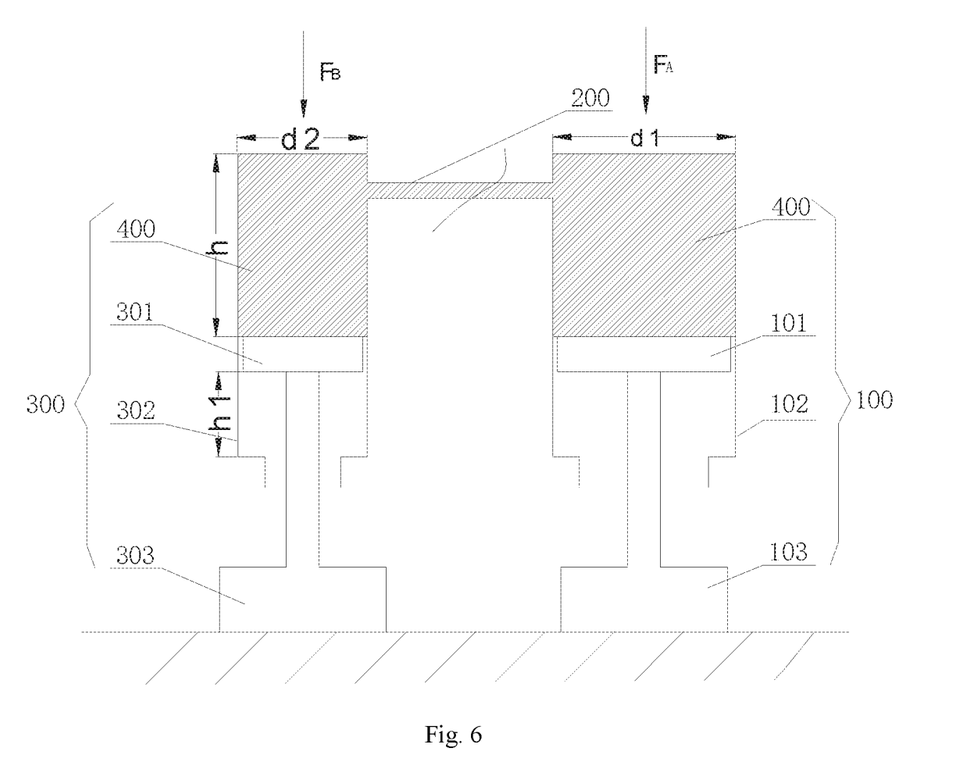
FIG. 6 is a structural schematic diagram of a leveling device provided by another embodiment of the present disclosure.

As shown in the FIG. 6, the household appliance leveling device provided by this embodiment comprises a first leveling foot 100 and a second leveling foot 300 communicating with the first leveling foot 100 via a high-pressure oil pipe set 200, wherein the first leveling foot 100 comprises a first cylinder 102 and a first plunger structure 101, the first cylinder 102 is provided with a hollow chamber therein, the first plunger structure 101 is provided with a first plug at one end, the first plug can be arranged in the hollow chamber in a relatively sliding manner and keeps sealed to form a closed chamber, the first plunger structure 101 is provided with a first support 103 at the other end, and the first support 103 is arranged on a support plane; and the second leveling foot 300 comprises a second cylinder 302 and a second plunger structure 301, the second cylinder 302 is provided with a hollow chamber therein, the second plunger structure 301 is provided with a first plug at one end, the first plug can be arranged in the hollow chamber in a relatively sliding manner and keeps sealed to form the closed chamber, the second plunger structure 301 is provided with a second support 303 at the other end, and the second support 303 is arranged on the support plane; and the inner diameter of the first cylinder 102 of the first leveling foot 100 is larger than the inner diameter of the second cylinder 302 of the second leveling foot 300.

The leveling device provided by this embodiment is installed according to the actual center of gravity of the household appliance, when the center of gravity of the household appliance does not coincide with the geometrical center of the household appliance, the first leveling foot 100 can be installed closer to the center of gravity, so that the leveling feet are uniformly stressed, and the household appliance can keep horizontal to the greatest extent after leveling.

Figure 7:
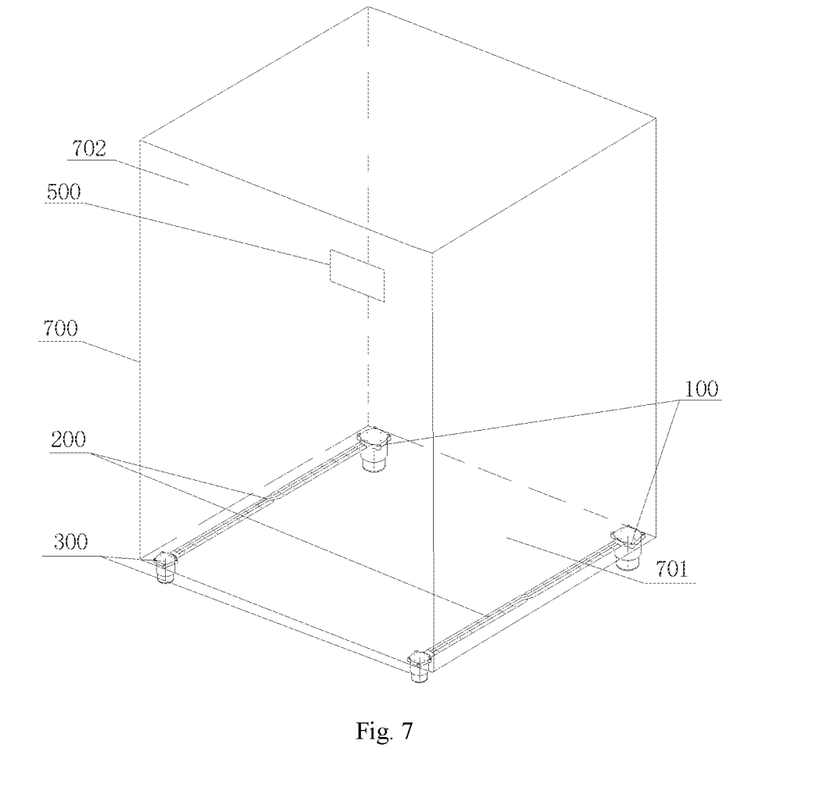
FIG. 7 is an installation schematic diagram of a leveling device provided by another embodiment of the present disclosure.

As shown in the FIG. 7, the leveling device provided by this embodiment comprises first leveling feet 100 and second leveling feet 300, wherein the first leveling feet 100 and the second leveling feet 300 communicate with each other via high-pressure oil pipe sets 200, and the area of the acting contact surface of hydraulic oil in each first leveling foot 100 is larger than the area of the acting contact surface of hydraulic oil in each second leveling foot 300.

Specifically, taking a drum washing machine for example, as a drive motor is installed on the outer side of the bottom of a drum, the overall center of gravity of the drum washing machine is closer to the bottom side of the drum, so that the above-mentioned leveling device is installed on a base plate 701 of a casing 700 of the washing machine, two first leveling feet 100 are mounted close to the bottom side of the drum, and two second leveling feet 300 are mounted close to the mouth side of the drum.

Figure 8:
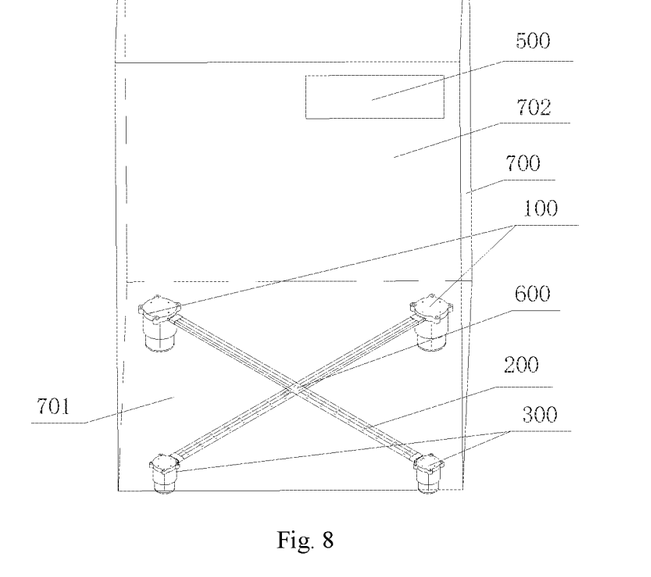
FIG. 8 is an installation schematic diagram of a leveling device provided by another embodiment of the present disclosure.

As shown in the FIG. 8, the leveling device provided by this embodiment comprises at least two first leveling feet 100 and at least two second leveling feet 300, wherein each of the first leveling feet 100 and the second leveling feet 300 is connected with a communication device 600 via a high-pressure oil pipe set 200 to achieve mutual communication of the closed chambers of all the leveling feet; and the area of the acting contact surface of hydraulic medium in each first leveling foot 100 is larger than the area of the acting contact surface of hydraulic medium in each second leveling foot 300.

Further, all the first leveling feet 100 are positioned on one side of the communication device 600, and all the second leveling feet 300 are positioned on the other side of the communication device 600.

Specifically, taking a drum washing machine for example, as a drive motor is installed on the outer side of the bottom of a drum, the overall center of gravity of the drum washing machine is closer to the bottom side of the drum, so that the above-mentioned leveling device is installed on a base plate 701 of a casing 700 of the washing machine, two first leveling feet 100 are mounted close to the bottom side of the drum, and two second leveling feet 300 are mounted close to the mouth side of the drum.

Therefore, flowing of the liquid medium between all leveling feet is achieved, adjustment can be performed in a larger range, and the adjustment effect is better.

Figure 9:
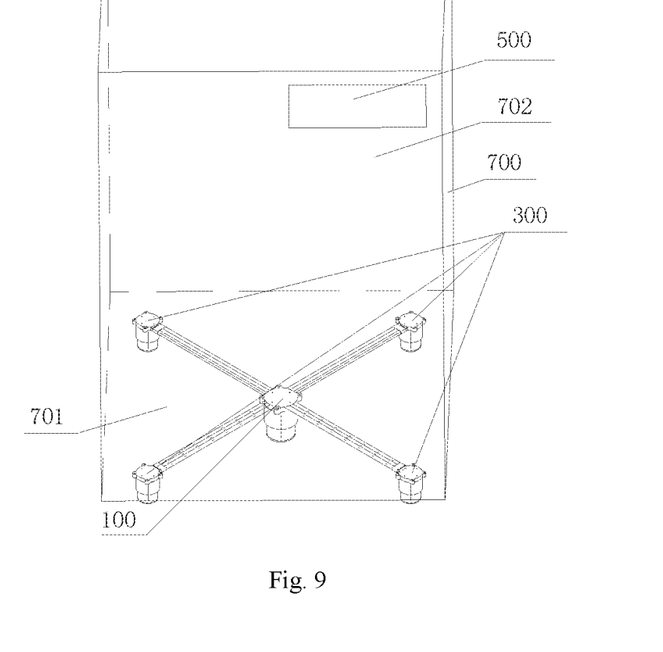
FIG. 9 is an installation schematic diagram of a leveling device provided by another embodiment of the present disclosure.

As shown in the FIG. 9, the leveling device provided by this embodiment comprises a first leveling foot 100 and at least two second leveling feet 300, wherein each second leveling feet 300 communicates with the first leveling foot 100 via a high-pressure oil pipe set 200; and the area of the acting contact surface of the hydraulic medium in the first leveling foot 100 is larger than the area of the acting contact surface of the hydraulic medium in each second leveling foot 200. Therefore, the first leveling foot 100 and the second leveling feet 300 can be adjusted according to actual usage to ensure uniform stress of the leveling feet, and thus the household appliance is horizontal and more stable.

As a preferred implementation mode of this embodiment, an inner diameter d1 of the cylinder of the first leveling foot and an inner diameter d2 of the cylinder of each second leveling foot meet the following condition:

a pressure borne by each first leveling foot is FA, a pressure borne by each second leveling foot is FB, and when FA=λFB, $d1=\sqrt{\gamma}d2$. In this embodiment, a theoretical design basis of the leveling feet is provided by formula derivation according to relations among pressure intensity, pressure and stress, selection can be made according to actual household appliance types and arrangement environment requirements, and thus better practicability and effect are achieved.

For more household motors, the stresses of the leveling feet mounted at the bottom of the household appliance are different due to a series of structural design such as installation of the motor or a balance weight, taking the drum washing machine for example, the motor is installed on the outer side of the bottom of the drum, a heating module of a drum washing machine with a drying function is also placed on the rear side of the casing, the stresses of the front and rear leveling feet are different, and the stresses of the leveling feet on the rear side are larger than the stresses of the leveling feet on the front side.

As shown in the FIG. 6, leveling feet on the rear side are first leveling feet 100, leveling feet on the front side are second leveling foot 300, and supposing that a pressure borne by each first leveling foot 100 is the double of a pressure borne by each second leveling foot 300, i.e. FA=2FB, the diameters of the first cylinder 102 and the first plug of each first leveling foot 100 bearing large stress are $\sqrt{2}$ times of the diameters of the second cylinder 302 and the second plug of each second leveling foot 300, that is to say the contact area between the plunger structure of each first leveling foot 100 and the hydraulic medium and the contact area between the plunger structure of each second leveling foot 300 and the hydraulic medium meet a condition that SA=2SB, and then $$PA = PB, \text{ i.e. } \frac{FA}{FB} = 2\frac{FB}{SB},$$

pressure intensities meet so that the pressure intensities of the hydraulic medium in the two feet are same, and the hydraulic medium stops flowing and thus keeps horizontal. Even the ground is uneven, as mentioned before, the hydraulic medium flows between the leveling feet, so that the pressure intensities are same, and the household appliance supported by the feet can also keep horizontal.

The casing 701 of the washing machine also comprises a front panel 702 on which a control panel 500 is arranged, and the first level feet 100 of this embodiment is arranged close to the front panel 702 side.

The embodiments of the present disclosure take the washing machine for example, and describe the principles and methods for automatically leveling the washing machine; it should be readily understood that the present disclosure can be applied to household appliances such as refrigerators, freezers and dish-washing machines.

The present disclosure simultaneously provides a household appliance with the above household appliance leveling device.

What described above are only preferred embodiments of the present disclosure, but are not intended to limiting the scope of the present disclosure in any forms. Although the present disclosure has been disclosed in terms of preferred embodiments, it is not limited thereto. Without departing from the scope of the technical solution of the present disclosure, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. A household appliance, comprising at least two leveling feet mounted at a bottom of the household appliance, wherein
    each leveling foot comprises a fixed part which is a cylinder and a movable part, the fixed part is mounted at the bottom of the household appliance, one end of the movable part is telescopically sleeved by sleeves on the fixed part, another end of the movable part is arranged on a support plane, a closed chamber is formed between the fixed part and the movable part, and the closed chamber is provided with a hydraulic medium;
    the closed chambers of at least two said leveling feet communicate with each other via an oil pipe set, the hydraulic medium flows under pressure between the closed chambers of the leveling feet communicating with each other, and the movable parts expand or contract along with the flowing of the hydraulic medium to perform automatic leveling; and
    acting contact surfaces of the hydraulic medium in the leveling feet communicating with each other via the oil pipe set have different areas;

the cylinders of the leveling feet communicating with each other via the oil pipe set have different inner diameters; wherein a center of gravity of the household appliance does not coincide with a geometrical center of the household appliance, the leveling foot with the cylinder having a larger inner diameter is installed closer to the center of gravity of the household appliance.

2. The household appliance according to claim 1, wherein the area of the acting contact surface of the hydraulic medium in each of the leveling feet communicating with each other via the oil pipe set is in direct proportion to a pressure value of pressure borne by the corresponding leveling foot.

3. The household appliance according to claim 1, wherein the movable part is a plunger structure, the cylinder is provided with a hollow chamber therein, the plunger structure is provided with a plug at one end, the plug is arranged in the hollow chamber in a relatively sliding manner and sealed to form a sealed chamber, the plunger structure is provided with a support at another end, and the support is arranged on the support plane.

4. The household appliance according to claim 3, wherein the inner diameter of the cylinder of each of the leveling feet communicating with each other via the high oil pipe set is in direct proportion to a pressure value of pressure borne by the corresponding leveling foot.

5. The household appliance according to claim 1, wherein the leveling device comprises a first leveling foot and a second leveling foot, the first leveling foot and the second leveling foot communicate with each other via the oil pipe set; and the area of the acting contact surface of the hydraulic medium in the first leveling foot is larger than the area of the acting contact surface of the hydraulic medium in the second leveling foot.

6. The household appliance according to claim 1, wherein the leveling device comprises at least two first leveling feet and at least two second leveling feet, wherein, each of the first leveling feet and the second leveling feet is connected with a communication device via the oil pipe set for mutually communicating the closed chambers of all the leveling feet; and the area of the acting contact surface of the hydraulic medium in each first leveling foot is larger than the area of the acting contact surface of the hydraulic medium in each second leveling foot.

7. The household appliance according to claim 6, wherein all the first leveling feet are positioned on one side of the communication device, and all the second leveling feet are positioned on another side of the communication device.

8. The household appliance according to claim 1, wherein the leveling device comprises one first leveling foot and at least two second leveling feet, wherein each second leveling foot communicates with the first leveling foot via the oil pipe set; and the area of the acting contact surface of the hydraulic medium in the first leveling foot is larger than the area of the acting contact surface of the hydraulic medium in each second leveling foot.

9. The household appliance according to claim 5, wherein an inner diameter d1 of the cylinder of the first leveling foot and an inner diameter d2 of the cylinder of the second leveling foot meet the following condition:

a pressure borne by the first leveling foot is FA, a pressure borne by the second leveling foot is FB, and when $FA=\lambda FB$, $d1=\sqrt{\gamma}d2$.

10. The household appliance according to claim 2, wherein the leveling device comprises a first leveling foot and a second leveling foot, the first leveling foot and the second leveling foot communicate with each other via the oil pipe set; and the area of the acting contact surface of the hydraulic medium in the first leveling foot is larger than the area of the acting contact surface of the hydraulic medium in the second leveling foot.

11. The household appliance according to claim 3, wherein the leveling device comprises a first leveling foot and a second leveling foot, the first leveling foot and the second leveling foot communicate with each other via the oil pipe set; and the area of the acting contact surface of the hydraulic medium in the first leveling foot is larger than the area of the acting contact surface of the hydraulic medium in the second leveling foot.

12. The household appliance according to claim 2, wherein the leveling device comprises at least two first leveling feet and at least two second leveling feet, wherein each of the first leveling feet and the second leveling feet is connected with a communication device via the oil pipe set for mutually communicating the closed chambers of all the leveling feet; and the area of the acting contact surface of the hydraulic medium in each first leveling foot is larger than the area of the acting contact surface of the hydraulic medium in each second leveling foot.

13. The household appliance according to claim 3, wherein the leveling device comprises at least two first leveling feet and at least two second leveling feet, wherein each of the first leveling feet and the second leveling feet is connected with a communication device via the oil pipe set for mutually communicating the closed chambers of all the leveling feet; and the area of the acting contact surface of the hydraulic medium in each first leveling foot is larger than the area of the acting contact surface of the hydraulic medium in each second leveling foot.

14. The household appliance according to claim 2, wherein the leveling device comprises one first leveling foot and at least two second leveling feet, wherein each second leveling foot communicates with the first leveling foot via the oil pipe set; and the area of the acting contact surface of the hydraulic medium in the first leveling foot is larger than the area of the acting contact surface of the hydraulic medium in each second leveling foot.

15. The household appliance according to claim 3, wherein the leveling device comprises one first leveling foot and at least two second leveling feet, wherein each second leveling foot communicates with the first leveling foot via the oil pipe set; and the area of the acting contact surface of the hydraulic medium in the first leveling foot is larger than the area of the acting contact surface of the hydraulic medium in each second leveling foot.

16. The household appliance according to claim 6, wherein an inner diameter d1 of the cylinder of the first leveling foot and an inner diameter d2 of the cylinder of the second leveling foot meet the following condition:

a pressure borne by the first leveling foot is FA, a pressure borne by the second leveling foot is FB, and when $FA=\lambda FB$, $d1=\sqrt{\gamma}d2$.

17. The household appliance according to claim 7, wherein an inner diameter d1 of the cylinder of the first leveling foot and an inner diameter d2 of the cylinder of the second leveling foot meet the following condition:

a pressure borne by the first leveling foot is FA, a pressure borne by the second leveling foot is FB, and when $FA=\lambda FB$, $d1=\sqrt{\gamma}d2$.

18. The household appliance according to claim 8, wherein an inner diameter d1 of the cylinder of the first leveling foot and an inner diameter d2 of the cylinder of the second leveling foot meet the following condition:

a pressure borne by the first leveling foot is FA, a pressure borne by the second leveling foot is FB, and when $FA=\lambda FB$, $d1=\sqrt{\gamma}d2$.

* * * * *